(12) United States Patent
Avrunin et al.

(10) Patent No.: US 12,177,607 B2
(45) Date of Patent: Dec. 24, 2024

(54) MEDIATING PARTICIPANT INTERACTIONS DURING A VIDEO WEBINAR MEETING

(71) Applicant: Zoom Video Communications, Inc., San Jose, CA (US)

(72) Inventors: Adam Avrunin, San Francisco, CA (US); Lopamudra Sengupta, San Jose, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 130 days.

(21) Appl. No.: 17/390,079

(22) Filed: Jul. 30, 2021

(65) Prior Publication Data

US 2023/0033852 A1 Feb. 2, 2023

(51) Int. Cl.
| | | |
|---|---|---|
| *H04N 7/15* | (2006.01) | |
| *G10L 25/57* | (2013.01) | |
| *H04L 65/403* | (2022.01) | |
| *G06F 40/30* | (2020.01) | |
| *G10L 15/18* | (2013.01) | |
| *G10L 15/22* | (2006.01) | |

(52) U.S. Cl.
CPC ............ *H04N 7/155* (2013.01); *G10L 25/57* (2013.01); *H04L 65/403* (2013.01); *H04N 7/15* (2013.01); *G06F 40/30* (2020.01); *G10L 15/1815* (2013.01); *G10L 15/22* (2013.01)

(58) Field of Classification Search
None
See application file for complete search history.

(56) References Cited

U.S. PATENT DOCUMENTS

| 9,794,514 | B1 | 10/2017 | Yoakum | |
|---|---|---|---|---|
| 11,063,778 | B2 * | 7/2021 | Stoner | ................ H04L 12/1822 |
| 11,507,342 | B1 * | 11/2022 | Agrawal | ................ H04N 7/147 |
| 2007/0263821 | A1 * | 11/2007 | Shaffer | ............ H04M 3/42187 |
| | | | | 379/202.01 |
| 2012/0140681 | A1 * | 6/2012 | Kaminsky | ............. H04L 65/403 |
| | | | | 370/261 |
| 2013/0108034 | A1 * | 5/2013 | Colbert | ................ H04M 3/566 |
| | | | | 379/202.01 |

(Continued)

OTHER PUBLICATIONS

International Search Report and Written Opinion for PCT Application No. PCT/US2022/033938 mailed Oct. 7, 2022.

(Continued)

*Primary Examiner* — Quoc D Tran
(74) *Attorney, Agent, or Firm* — Kilpatrick Townsend & Stockton LLP

(57) ABSTRACT

One example method for mediating participant interactions during a video webinar meeting includes establishing a video webinar meeting; admitting a host and a plurality of participants to the video webinar meeting; not distributing audio streams from the plurality of participants to other participants in the video webinar meeting; receiving, from a first participant, a first submission to be posed during the video webinar meeting; determining a priority for the first submission based on one or more parameters; and distributing an audio stream associated with the first participant to the host and the remaining plurality of participants based on the priority to enable the first participant to pose the first submission.

27 Claims, 10 Drawing Sheets

(56) References Cited

U.S. PATENT DOCUMENTS

| | | | | |
|---|---|---|---|---|
| 2013/0143539 A1* | 6/2013 | Baccay | ................ | H04M 3/563 |
| | | | | 455/566 |
| 2016/0344780 A1* | 11/2016 | Kay | ...................... | H04M 3/563 |
| 2022/0191257 A1* | 6/2022 | Aceron | ................... | H04N 7/15 |
| 2022/0353220 A1* | 11/2022 | Balaji | ................ | H04L 12/1831 |

OTHER PUBLICATIONS

PCT/US2022/033938, "International Preliminary Report on Patentability", Feb. 8, 2024, 10 pages.

* cited by examiner

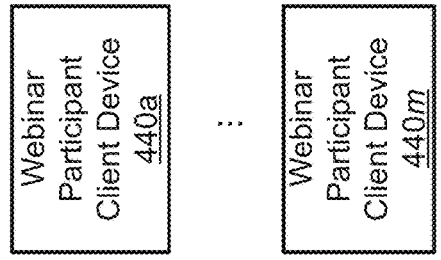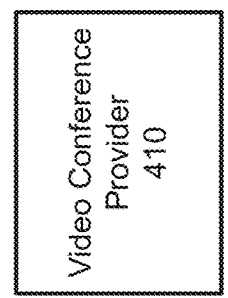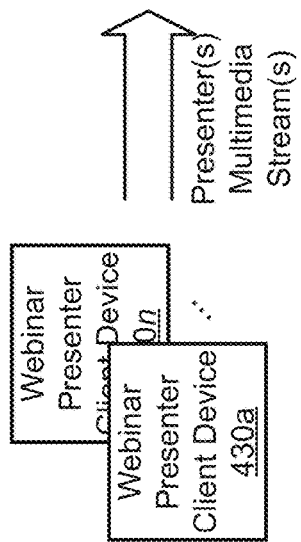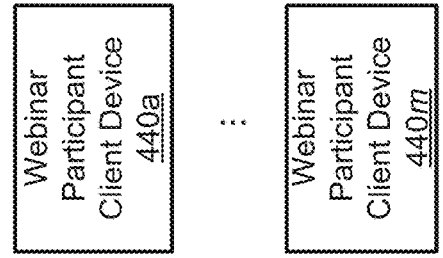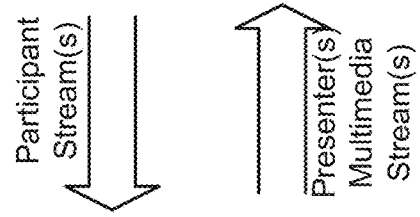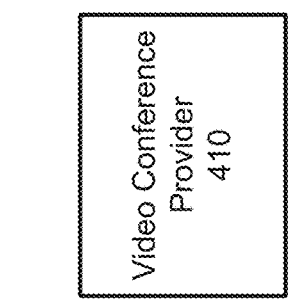
FIG. 4A
FIG. 4B

MEDIATING PARTICIPANT INTERACTIONS DURING A VIDEO WEBINAR MEETING

FIELD

The present application is generally related to videoconferencing and more specifically related to mediating participant interactions during a video webinar meeting.

BACKGROUND

Video conferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for mediating participant interactions during a video webinar meeting. One example method for mediating participant interactions during a video webinar meeting includes establishing a video webinar meeting; admitting a host and a plurality of participants to the video webinar meeting; not distributing audio streams from the plurality of participants to other participants in the video webinar meeting; receiving, from a first participant, a first submission to be posed during the video webinar meeting; determining a priority for the first submission based on one or more parameters; and distributing an audio stream associated with the first participant to the host and the remaining plurality of participants based on the priority to enable the first participant to pose the first submission.

One example system for mediating participant interactions during a video webinar meeting includes a communications interface; a non-transitory computer-readable medium; and one or more processors in communication with the communications and non-transitory computer-readable medium, the one or more processors configured to execute processor-executable instructions stored in the non-transitory computer-readable medium to: establish a video webinar meeting; admit a host and a plurality of participants to the video webinar meeting; not distribute audio streams from the plurality of participants to other participants in the video webinar meeting; receive, from a first participant, a first submission to be posed during the video webinar meeting; determine a priority for the first submission based on one or more parameters; and distribute an audio stream associated with the first participant to the host and the remaining plurality of participants based on the priority to enable the first participant to pose the first submission.

One example non-transitory computer-readable medium comprising processor-executable instructions configured to cause one or more processors to establish a video webinar meeting; admit a host and a plurality of participants to the video webinar meeting; disable audio streams from the plurality of participants; receive, from a first participant, a first submission to be posed during the video webinar meeting; determine a priority for the first submission based on one or more parameters; and distribute an audio stream associated with the first participant to the host and the remaining plurality of participants based on the priority to enable the first participant to pose the first submission.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 4A-4C show an example system illustrating multimedia stream communication for mediating participant interactions during a video webinar meeting;

DETAILED DESCRIPTION

Figure 1:
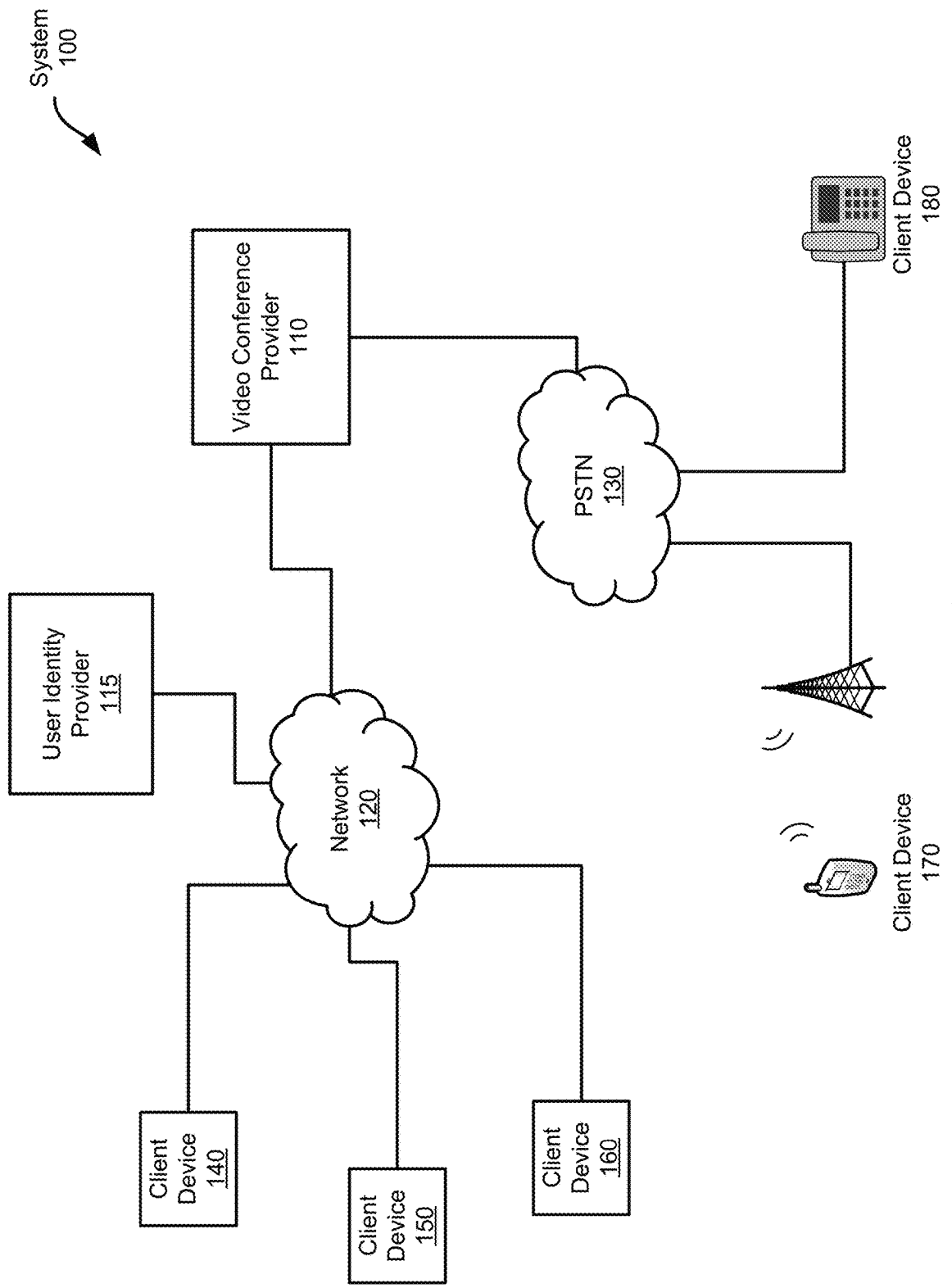
FIGS. 1-3 show example systems for mediating participant interactions during a video webinar meeting.

Examples are described herein in the context of systems and methods for mediating participant interactions during a video webinar meeting. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own electronic devices (or "client devices") with both video and audio in a variety of settings, such as in one-on-one conversations, group meetings, and webinar meetings (or "webinars"). While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction is predominantly one-way: from the presenter(s) to the audience. In addition, webinars can have very large numbers of participants, potentially numbering in the thousands or tens of thousands.

Because webinars are intended to enable a presenter (or presenters) to communicate with the other participants in a lecture or similar-styled format, the video conference provider does not provide audio streams (or video streams in some examples) from participants to other participants or to the presenters. Instead, the participants only receive audio and video streams from the presenters. Thus, it is difficult to allow feedback from webinar participants to the presenters.

However, presenters still may wish to receive questions or comments from participants in their webinars. To enable participants to interact with the presenters, an example video conference system may allow participants to provide questions to the video conference provider, such as by selecting a feedback option in a graphical user interface ("GUI") and then typing questions, comments, or information they would like to contribute to the webinar into a text entry field or speaking such information into their microphones (followed by the video conference provider converting the spoken question into text). The video conference provider may then determine a priority of the participant's submission, such as by analyzing the content of the submission to determine if multiple participants seem to be asking the same question, or based on a reputation score of the participant asking the question. As participants ask questions, etc., the video conference provider may determine which to suggest to the presenter based on their priorities, from which the presenter can select and authorize the participant to pose their question, comment, contribution, etc. (or the video conference provider may autonomously authorize a particular participant) and then enable the participant to use their video or audio stream to contributed to the webinar.

Using such techniques, a video conference provider may enable efficient webinar-style video conferences, where a presenter may effectively provide content to a large number of participants and also easily determine which interactions from participants may be of value. The presenter can then selectively enable interactions with specific participants to further enrich the content within the video conference, while moving past questions or comments that are redundant of other questions, may be incendiary or offensive, or may simply be irrelevant to the topics at hand.

By configuring the video conference provider to receive feedback from webinar participants and to analyze that incoming feedback, while simultaneously blocking video and audio streams from being distributed to the presenter or to other webinar participants, the video conference provider can effectively manage the participants in the webinar. In addition, it can provide curated information to the presenter to enable the presenter to quickly determine feedback that may be of interest and selectively enable interactions that would otherwise be prohibited. Further, in some cases, the video conference provider may autonomously determine that a particular question or comment is of sufficient value that it can simply enable the participant to pose the question or make the comment without first obtaining authorization from the presenter. Thus, systems and methods according to this disclosure may enable a richer, more meaningful and interactive webinar experience, but without burdening the presenter or an assistant with the task of sifting through large numbers of incoming questions to identify particularly valuable or insightful questions.

This illustrative example is given to introduce the reader to the general subject matter discussed herein and the disclosure is not limited to this example. The following sections describe various additional non-limiting examples and examples of systems and methods for mediating participant interactions during a video webinar meeting.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
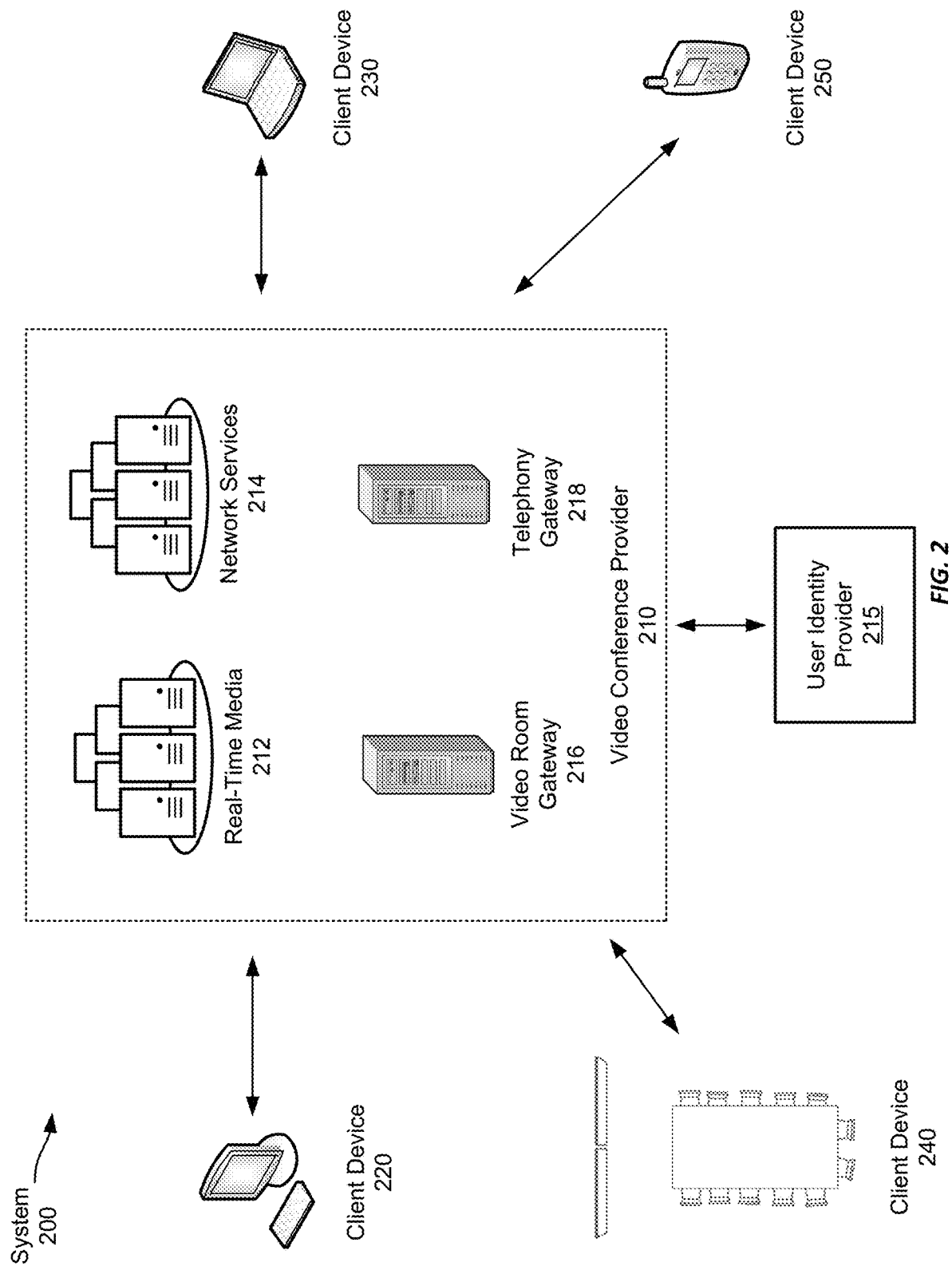

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server to which participants are connected and at which the various video and audio data is received before being multiplexed and provided to the various participants connected to the room. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute some or all of the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode) to the video conference provider 110. The video conference provider 110 then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams (collectively "multimedia streams") to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio streams when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
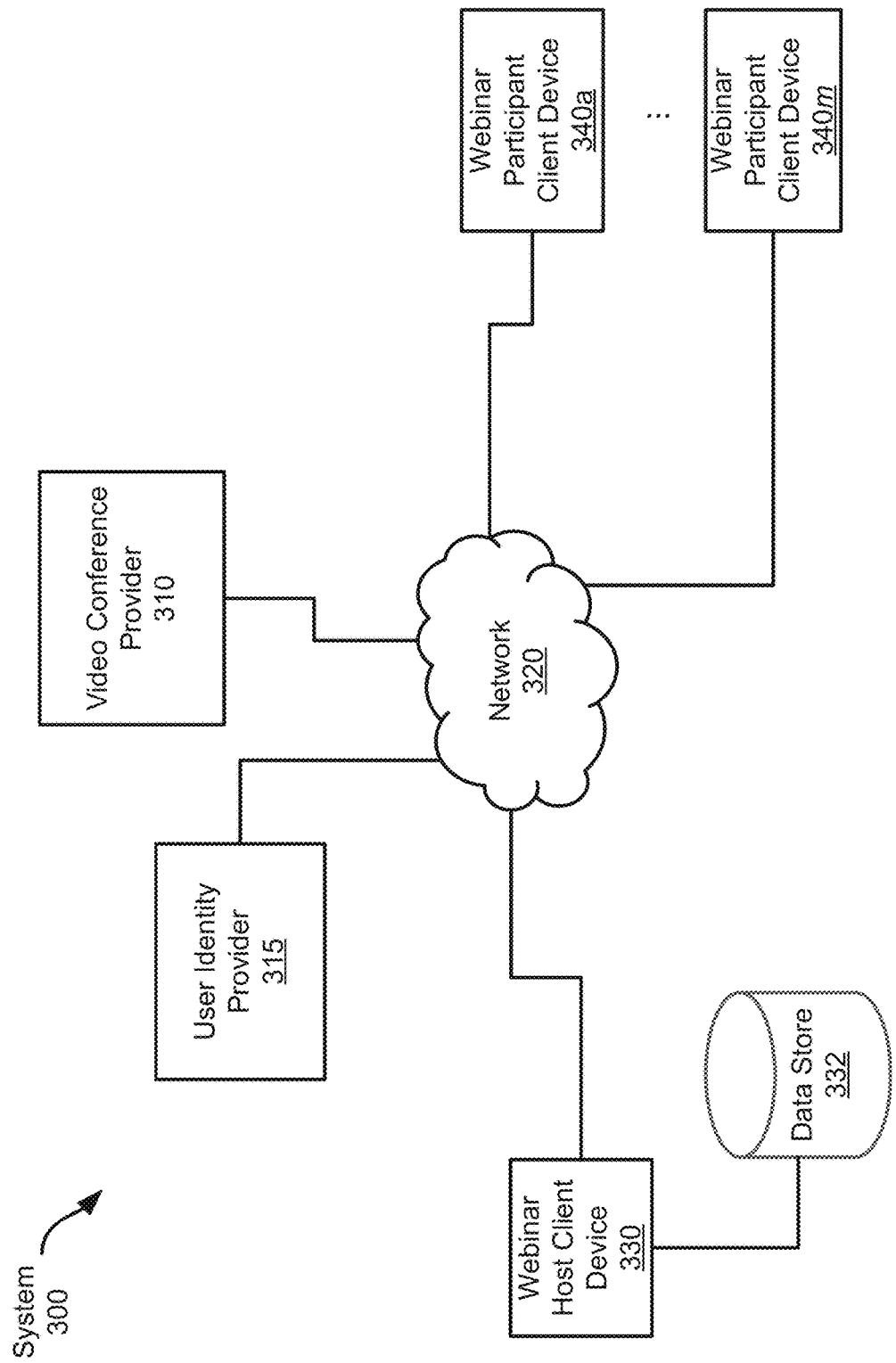

Referring now to FIG. 3, FIG. 3 shows an example system 300 for enabling mediating participant interactions during a video webinar meeting. In this example, a video conference provider 310, such as the video conference provider 110, 210 in FIG. 1 or 2, is connected to a communications network 320, such as the internet. A webinar host client device 330, a user identity provider 315, and a number of webinar participant client devices 340*a-m* (m representing any number of webinar participant client devices in this example) are also connected to the network 320.

The webinar host client device 330 connects to the video conference provider 310 and begins a webinar meeting at the video conference provider 310, such as by beginning a scheduled webinar, generally as described above with respect to FIGS. 1 and 2. However, when scheduling the meeting, the host schedules the meeting as a webinar. In this example, the video conference provider 310 creates and manages webinars similarly to how it handles conventional meetings as discussed above. However, because webinars generally are intended to operate one-way from the presenter(s) to the participants, the video conference provider 310 may limit certain functionality to general participants to the webinar.

For example, in a webinar the video conference provider 310 may prohibit participants from unmuting their microphone or from streaming video to the webinar for other participants to view. In addition, unlike in a conventional meeting, the participants in a webinar may not receive any information about other participants in the webinar. In a conventional meeting, participants may be able to interact with other participants and see their respective names, such as in close proximity to other participants' video streams or in a list of participants visible in a GUI. Instead, in a webinar, the participants may only be able to see information, e.g., names or video streams, from the host(s) of the webinar or certain select participants that will be engaged in discussions during the webinar, such as panelists in a panel discussion. Still other limits may be imposed on the various participants, such as their ability to react to occurrences during the webinar, e.g., participants may be allowed to interact with their GUI to raise their hand to ask a question, but may not be allowed to provide any other feedback.

When the video conference provider 310 begins the webinar, it creates a new meeting (including any applicable restrictions, such as those discussed above) and provides video and audio streams that may be accessed by participants to receive video and audio content during the webinar. Participants, through their respective webinar participant client devices 340*a-m*, may join the webinar once it has started and connect to the available video and audio streams.

During the course of the webinar, the webinar host client device 330 may present content to the participants, such as presentation material stored on the data store 332, through a video stream containing such presentation material or using the presenter's own video stream (or multiple such video streams). If multiple different participants will present content, such as in a panel discussion or as co-presenters, such video streams may be provided by other client devices that have been assigned a presenter or panelist role, such as by the host or by the video conference provider 310. Such roles may remove some or all of the restrictions placed on the other participants in the webinar.

As a result of this basic webinar configuration, participant client devices 340*a-m* are unable to interact with the presenters, such as to ask questions or provide feedback or comments on the webinar materials. However, participant interaction is often desirable in webinars. But enabling all participants to interact at any time may result in significant disruption to the webinar. Alternatively, the webinar host may establish a question-and-answer ("Q/A") period at the end of the webinar when participants may indicate if they have a question or comment to make. The host can then distribute that participant's audio or video streams to allow them to interact with the host or presenter.

But rather than requiring all participants to wait until the webinar content has concluded, or establishing defined periods for asking questions, the example system enables webinar participants to submit questions, comments, proposed contributions, etc. which can then be analyzed by the video conference provider 310 to determine priorities for the received submissions and then enable one or more participants to interact during the webinar, without waiting for a defined Q/A period.

Referring now to FIG. 4A, FIG. 4A illustrates a flow of video and audio streams in a webinar where the video conference provider does not mediate participant interactions. As discussed above, one or more presenters, using a webinar presenter client device (or just "presenter client device") 430*a-n*, provide multimedia streams to the video conference provider 410, which in turn provides the multimedia streams to the various webinar participant client devices (or just "participant client device") 440*a-m*. However, the webinar participant client devices do not, in turn, provide audio or video streams to the video conference provider 410. In this example, the participant client devices 440a-m execute video conference client software that determines that the video conference is a webinar, e.g., based on messaging exchanged with the video conference provider 410 upon joining the webinar, and does not obtain or transmit video or audio information to the video conference provider 410. In addition, the video conference provider 410 prevents the participant client devices 440a-m from sending text messages via a text messaging interface available in the video conference client software. Thus, as is shown in FIG. 4A, during the webinar presentation, multimedia streams proceed only from the presenter client devices 430a-n to the participant client devices 440a-m, via the video conference provider 410.

FIG. 4B illustrates an example where the video conference provider 410 hosts a webinar that provides functionality to mediate participant interactions during a webinar. In this example, the video conference provider 410, as above, distributes audio and video streams from the presenter client devices 430a-n to the various participant client devices 440a-m, via the video conference provider 410. In addition, the video conference provider 410 provides an indication to the participant client devices 440a-m that allows questions or comments to be input at any time during the webinar. Thus, the participant client devices 440a-m may provide multimedia streams to the video conference provider 410 as well as text messaging, which may be provided via a separate multimedia stream or via a separate signaling channel in different examples.

Figure 4C:
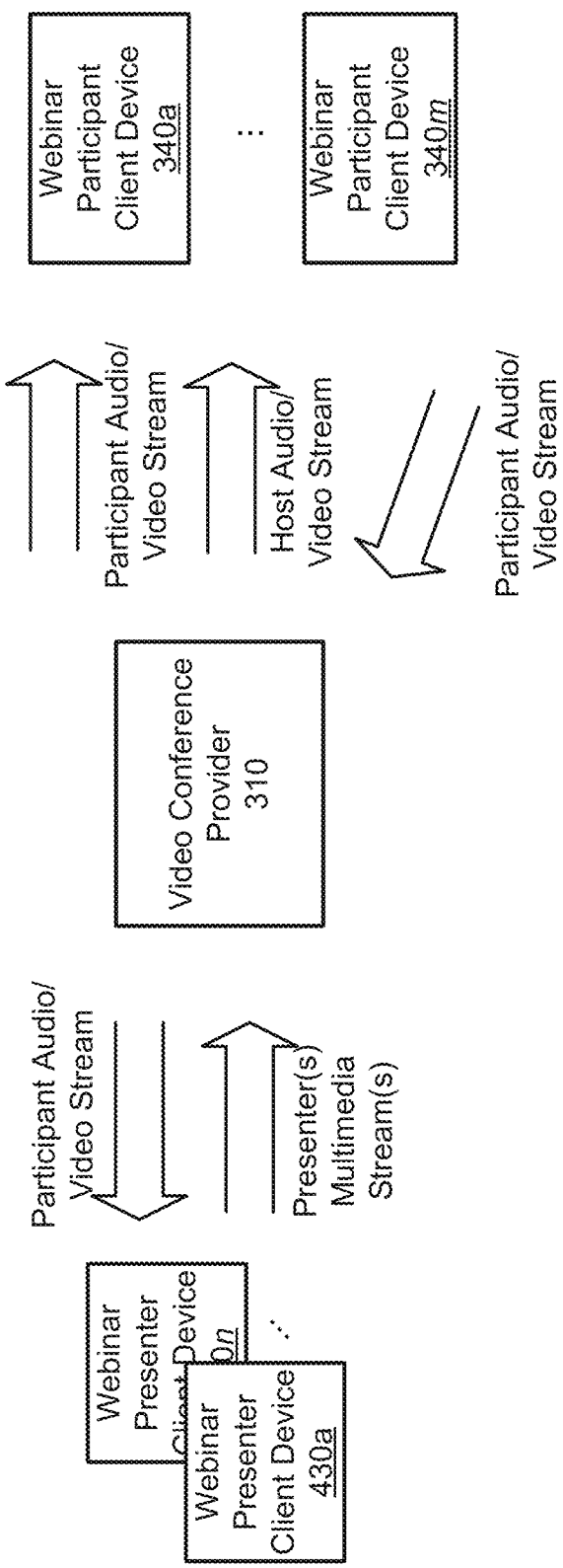

When the video conference provider 410 receives the participant streams, it processes the contents of the streams to extract semantic information that may be used to determine the question being asked or the comment being provided in the respective streams. This semantic information can then be used to prioritize questions and provide them to the presenter client devices 430a-n for review and presentation to the webinar. Or it can be used by the video conference provider 410 itself to select one or more questions or comments to share in the webinar. Once a question or comment has been selected for presentation in the webinar, the video conference provider 410 can provide an indication that a participant comment or question will be posed and provide an indication to the corresponding participant client device that their question or comment has been approved and they may interact with the presenters. In addition, and as illustrated in FIG. 4C, the video conference provider 410 receives multimedia streams from the selected participant client device and distributes it to the presenter client devices 430a-n and to the other participant client devices 440a-m. Thus, the participant is able to ask their question directly to the presenters, who may then interact with the participant. After which, the presenter may indicate the interaction has completed and the video conference provider 410 can again disable the participant's audio and video streams.

Figure 5:
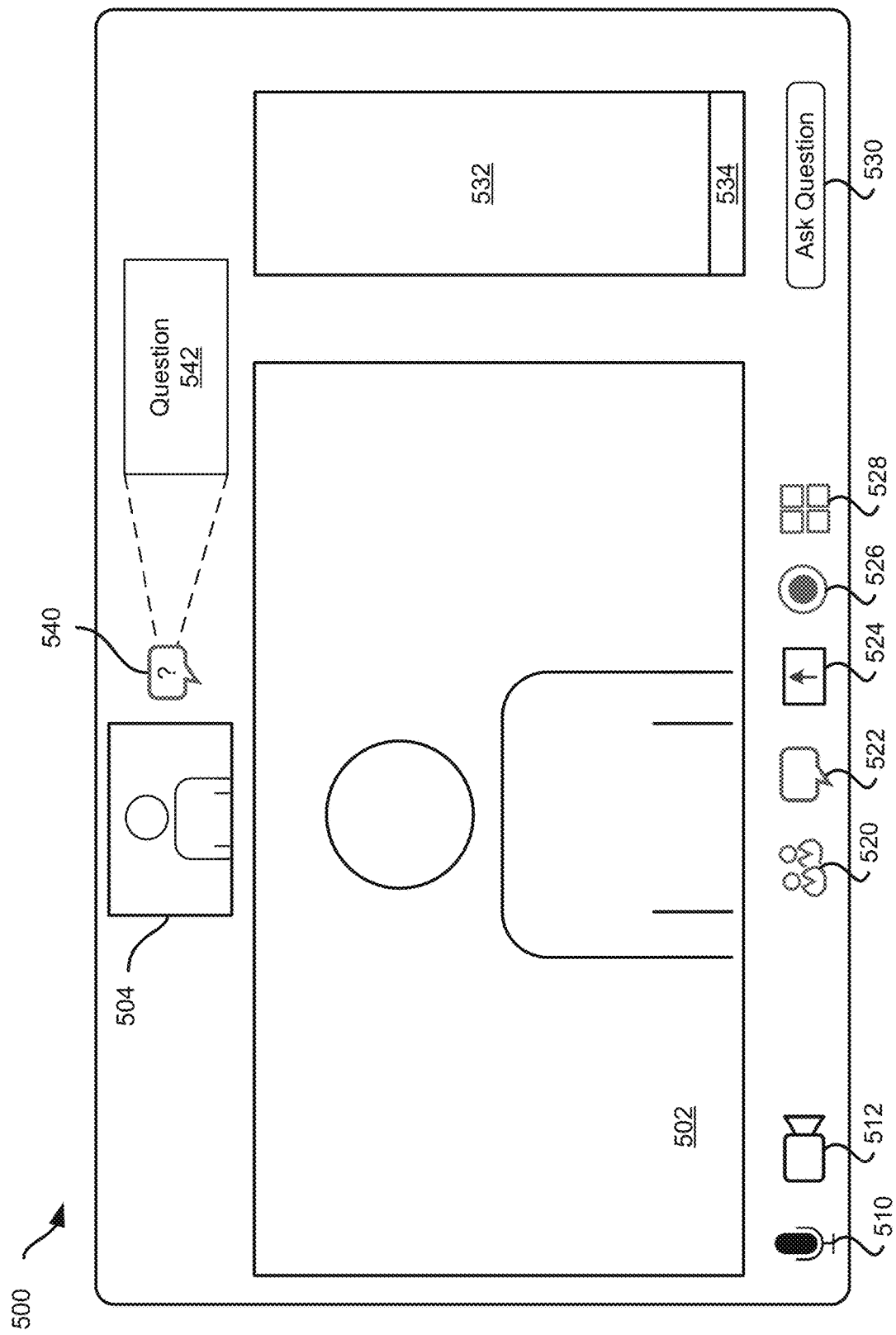
FIGS. 5-6 show example graphical user interfaces for mediating participant interactions during a video webinar meeting.

Referring now to FIG. 5, FIG. 5, shows an example GUI 500 presented by video conference client software executed at a participant client device, e.g., participant client devices 340a-m, 440a-m. The participant client device executes video conference software, which in turn displays the GUI 500 on the participant client device's display. In this example, the GUI 500 includes a speaker view window 502 that presents the current speaker in the webinar. Above the speaker view window 502 is a participant window 504, which shows the participant a view of their own video stream.

In addition to the speaker view window 502 and the participant window 504, the GUI 500 also includes a text message 532 window and a text entry field 534 to allow the participant to type a submission for the presenter. To submit the submission, the user may press the "Ask Question" button 530 after typing the submission in the text entry field 534. Thus, the participant may view the presenter in the main speaker view 502, while entering text-based questions. It should be appreciated that a submission may be a question or comment, but may be anything that the participant would like to contribute to the webinar, which may be a description of information or a document they would like to share, expertise on a particular subject, etc. While examples herein may discuss participants providing questions or comments, such references are intended to encompass any written or spoken content submission during the webinar.

Beneath the speaker view window 502 are a number of interactive elements 510-528 to allow the participant to interact with the video conference software. Controls 510-512 may allow the participant to toggle on or off audio or video streams captured by a microphone or camera connected to the host client device. Control 520 allows the participant to view other participants in the meeting with the participant. In this example, the participant will be limited to seeing the names of the designated presenters in the webinar rather than the names of all other participants in the webinar. Control 522 toggles the text message window 532 and text entry field 534. If the participant does not wish to ask any questions, they can hide those GUI elements by selecting the control 522. Control 524 allows the participant to share content from their client device, which may be disabled for ordinary participants in a webinar meeting. Control 526 allows the participant toggle recording of the meeting, which also may be disabled for ordinary participants in a webinar meeting.

As discussed above, the participant may enter a question in the text entry field 534 and press the "Ask Question" button 530 to submit the question to the video conference provider. However, some examples may allow the user to record a question using their microphone and send the recorded audio to the video conference provider. To do so, the user may select the "Ask Question" button 530 without typing any text in the text entry field 534. The GUI 500 may present a visual notification to the participant asking if they would like to record an audio question. Or the participant may simply unmute their microphone by toggling control 510 and ask their question while the microphone is active. Such an embodiment may enable the participant to feel as though they are asking their question in real-time by interacting with the GUI 500 as they might during an ordinary videoconference—unmuting the microphone and asking a question—despite the question not being immediately provided to the presenter.

But as discussed above, if the participant asks a question using their microphone, the audio stream may be provided to the video conference provider, where it is processed to determine a priority for the question, but it will not then be provided to the presenter client device(s) or to the other participant client devices. Instead, the video conference provider performs speech to text conversion and then performs semantic analysis on the text and determines a priority for the question or comment, as will be discussed in more detail below with respect to FIG. 7.

In some examples, the participant may receive a notification of a priority for their question, or that the question was received and is queued for consideration by the presenters. As shown in FIG. 5, the participant has posed a question to the presenters, and the question has been received and processed by the video conference provider. The GUI 500 notifies the participant that the question has been received and processed by providing a question chat icon 540 next to the participant's speaker view 504. The participant may interact with the question chat icon 540 to obtain information about the question in a pop-up window 542, such as to see what they asked, when the question was asked, priority information about the question, whether other participants asked the question as well, whether the question has been selected for consideration, etc. Further, the icon 540 itself may provide some such information, such as based on the color of the icon, an animation of the icon, or other visual or audible cues. For example, the icon 540 may turn green if the participant's question has been selected to be posed, or it may turn yellow if it is put into the queue, or it may turn red if it is either not going to be presented or another participant will pose the question instead. In addition, the participant may be notified by the icon 540 if other participants have asked questions and may be able to select one or more of those questions to see them and, in some examples, vote for or against the question being asked, such as by pressing an "up" vote button or "down" vote button displayed with the question.

Thus, the GUI 500 provides the participant with an interface through which they can view webinar content and interact with the webinar presenters using mechanisms to mediate the interactions.

Figure 6:
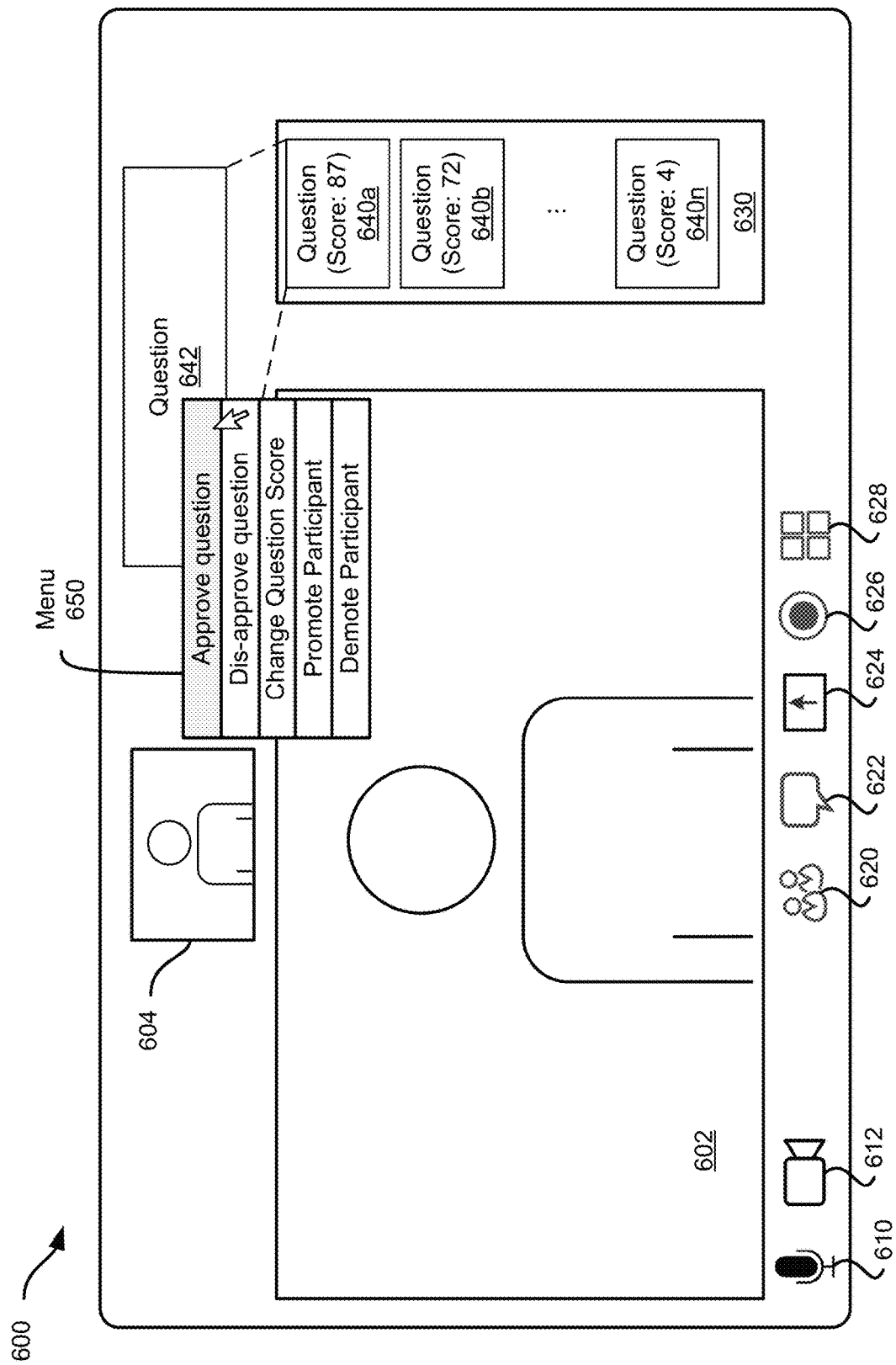

Referring now to FIG. 6, FIG. 6 shows another example GUI 600 provided by video conference client software executed at a webinar host or presenter client device, e.g., host or presenter client devices 330*m* 430*a-n*. The host or presenter client device executes video conference software, which in turn displays the GUI 600 on the host or presenter client device's display. In this example, the GUI 600 includes a speaker view window 602 that presents the current speaker or presented content in the webinar. Above the speaker view window 602 is a participant window 604, which shows the presenter a view of their own video stream. In cases where the presenter is presented in the speaker view window 602, e.g., because they are not sharing other presentation content, both speaker windows 602, 604 may show the same video streams, or the participant window 604 may be hidden.

The GUI 600 shown in FIG. 6 includes many of the same GUI elements as discussed above with respect to FIG. 5, such as controls 610-620 and controls 620-628, which correspond to controls 510-512 and 520-528. In this example, both the presenter or host and the participants execute the same video conference software client; however, their GUIs differ based on their respective roles in the webinar. Thus, the same controls may be presented in both GUIs, while the presenter may have more ability to employ such controls, such as to record the webinar using control 626 or view participants as well as presenters in a participant list by using control 620.

In addition to controls 610-612 and 620-628, the GUI 600 includes a question queue 630, which includes one or more questions 640*a-n* posed by participants in the webinar. The questions are sorted in the queue 630 according to their respective priorities or scores. The presenter or host can select individual questions to review, such as in a pop-up question window 642. The question window 642 may provide the substance of the question as well as information about the question, such as whether multiple participants have asked the same question, the determined priority of the question, when the question was asked, etc. The host or presenter may also interact with a question 640*a-n* or the question pop-up window 642 to approve the question and notify the associated participant that they can interact with the presenter and the webinar via one or more multimedia streams. For example, the host or presenter may right click on the question 640*a-n* or the question pop-up window 642 to view a menu 650 of options for the question, such as to approve the question, dis-approve the question, change the question score or move the question to a different position within the question queue 630, promote or demote the participant, etc. Further, in some examples, the question queue may include questions that the video conference provider has selected. Thus, the question queue 630 may notify the presenter of the next question that will be asked, and the presenter can then interact with the participant. Thus, the GUI 600 may provide the host or presenter with an interface to present to the webinar but also to mediate interactions with webinar participants.

For some submissions, the host may wish to provide a participant with a more significant role in the webinar than to just allow them to ask a question. Thus, some examples, the host or other participant with suitable authority may temporarily promote a participant, such as to join a panel as a guest panelist. By selecting the "promote" option in the menu 650, the participant may be changed to have an elevated role in the webinar, such as by joining an existing panel or by becoming a co-presenter on a topic. Such a promotion may enable the participant to view a GUI similar to the one shown in FIG. 6, which may allow them to view a question queue 630 and interact with submissions similarly to how the host or other panelists may. The participant may later be demoted, such as after discussion on a corresponding topic has concluded.

In some examples, multiple participants in the webinar may have access to GUI 600 to help manage received questions, comments, etc. For example, each panelist in a group of panelists may be provided such a GUI 600 and be able to perform functionality, such as that discussed above. Some examples may also allow a webinar manager participant to manage such received questions, comments, etc. A webinar manager may be designated by the host or webinar organizer and may join the webinar to facilitate and unburden the host or panelists from considering incoming questions, comments, etc. The webinar manager may be similarly blocked from participating via audio or video as a normal participant is, but may be provided permission to exercise control over received comments, questions, etc. from various webinar participants. Changes made to the question queue 630 by the webinar manager may then be reflected in the respective meeting queue 630 displayed to the host, panelists, etc.

Figure 7:
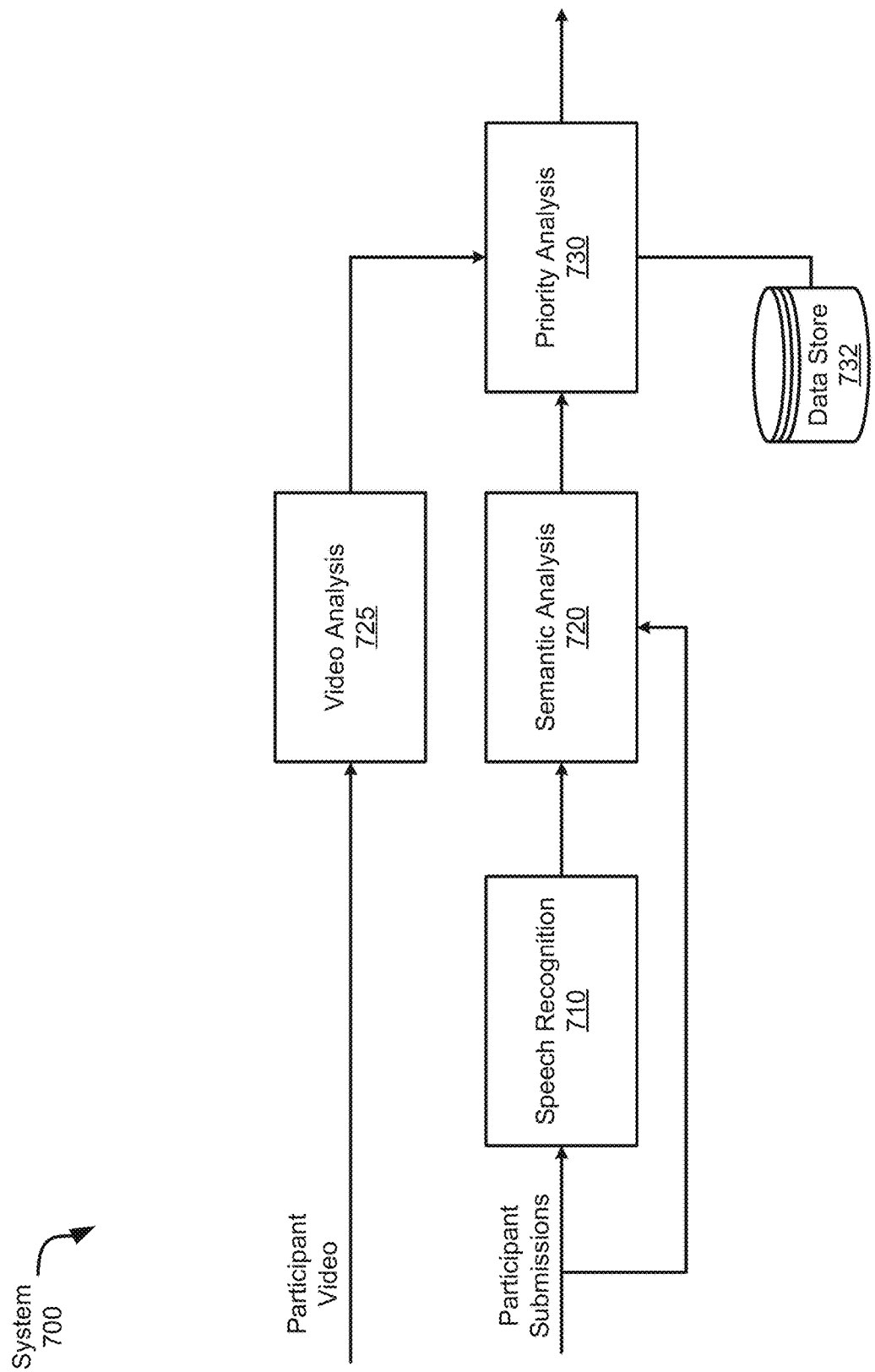
FIG. 7 shows an example system for mediating participant interactions during a video webinar meeting.

Referring now to FIG. 7, FIG. 7 shows an example system 700 for mediating participant interactions during a video webinar meeting. In this example, the system 700 includes a speech recognition software component 710 that receives audio streams from participants in a webinar. The speech recognition component 710 provides recognized speech as text information to a semantic analysis software component 720, which analyzes the incoming text information for semantic information. In addition, participant video may also be received, if a participant is employing a camera. The participant video may be supplied to a video analysis component, which analyzes the video to determine information, such as user engagement, emotion, etc. to determine video information. The determined semantic information and, if available, determined video information is provided to a priority analysis software component 730 which determines a priority for the corresponding participant submission. The determined priority is then associated with the corresponding submission and may be provided to a webinar host or presenter or may be employed by the video conference provider to enable participant interaction during the webinar.

Speech recognition software component 710 includes any suitable speech recognition techniques. These may include commercially available speech recognition software or may be provided by a third-party speech recognition service. As discussed above, the speech recognition software component 710 receives audio streams and performs speech recognition on each received stream. As discussed above with respect to FIG. 5, a participant may select an option to ask a question and speak the submission into a microphone connected to their client device. The video conference software client may digitize the received audio and provide it as an audio stream to the video conference provider. However, if the participant is not yet authorized to interact during the webinar, the audio stream is not provided to the webinar host or presenters or to other webinar participants. Instead, the video conference provider receives the audio stream and provides it to the speech recognition software. To do so, the video conference provider may record the received audio stream and provide the complete recorded audio stream to the speech recognition software component 710, or it may provide it to the speech recognition software component 710 in real time as the audio stream is received. The speech recognition software component 710 generates text from the received audio stream and outputs the text corresponding to the audio stream as text information.

In some examples, however, participants may ask questions using text entry functionality, as discussed above. When a participant asks a question via text entry, the received question may bypass the speech recognition software component 710 and be directly provided to the semantic analysis software component 720.

The semantic analysis software component 720 receives text information from the speech recognition software component 710, or if questions were originally entered as text, it may receive those text questions directly. The semantic analysis component 720 determines the content of questions or comments received from the participant. Any suitable semantic analysis software or techniques may be used according to different examples. The output of the semantic analysis software component 720 may include identified noun or verb phrases, concepts, etc. The semantic analysis may also include functionality such as grammatical analysis of the question or comment. For example, the semantic analysis may determine whether the question follows grammatical conventions for the language or if it deviates from them. It may also analyze the complexity of phrases within the question. For example, it may determine whether the question was asked over multiple sentences, how many subordinate clauses are detected within the question, the complexity of terms used within the question, etc. The determined semantic information may then be provided to the priority analysis software component 730.

In addition to analyzing the, in examples where a participant provides a video stream as well as an audio stream, the video conference provider 310 may use one or more ML models to analyze aspects of the video to determine characteristics of the participant, such as their engagement during the webinar, one or more emotions, etc. For example, the video conference provider 310 may employ gaze detection to determine if the participant is looking at their screen or in another direction. In some examples, the video conference provider 310 may use a trained ML model to analyze the participant's face to determine if the user is interested or not, angry, happy, distracted, etc. Such information may be used by the priority analysis component 730 to adjust a priority of the submission.

The priority analysis software component 730 determines a priority associated with the question or comment from the participant. Priority for a question or comment may be based on many different factors. For example, a priority may be based solely on grammatical information about the question itself, such as based on the grammar of the question or comment and the complexity of the phrasing within the question or comment, as discussed above. For example questions with high grammar scores may be weighted towards a higher priority, while questions with low grammar scores may be weighted towards a lower priority. Similarly, questions that employ sophisticated or complex terminology may be given higher (or lower) priority scores with respect to those that employ simpler terms.

In addition to analyzing the question itself to determine a priority, the priority analysis software component 730 may access a data store 732 that includes other questions posed by participants during the webinar. It may then determine whether one or more prior questions are directed to the same or similar topics as the then-current questions under analysis. If multiple participants are posing similar questions about common topics, it may increase the priority of one or more of the questions related to the topic. For example, a priority for one or more of the identified questions may be increased based on the number of questions related to the same or similar topic.

In addition to determine whether the questions are similar, the priority analysis software component 730 may also determine a difference in time between when the various questions were asked. If multiple questions are all asked at approximately the same time, e.g., within a five-minute window, those questions may affect the priority score of the new question. However, if the questions are similar, but were asked 30 minutes apart, it may not affect the priority score at all, or it may have a reduced impact on the priority score than if it had been asked within the predefined window. In another embodiment, if similar questions are asked multiple times over an extended period of time, e.g., similar questions are asked over a period of fifteen minutes, a priority for a similar question may be increased for each time the question was asked may be increased, which may indicate that the question may not have been adequately answered or that the question remains relevant to the webinar. In some cases, if similar questions are asked consistently throughout the webinar, the priority analysis software component 730 may establish a high (or highest) priority for additional questions received from participants, which may ensure that the question is ultimately posed to the presenter or host during the webinar.

If video analysis is performed, it may be used to adjust a priority for the submission. For example, if the video analysis indicates that the participant is agitated or angry, it may decrease the priority of the question. Whereas if the participant appears to be engaged, e.g., based on gaze tracking, and curious, the priority analysis component 730 may increase a priority of the submission.

In some examples, other factors may be employed to increase or decrease a priority of a question or comment. Some video conference providers may increase the priority of a question if the participant has a registered account with the video conference provider, has had a registered account for an extended period of time, or has attended at least a threshold number of meetings or webinars since becoming a registered user. In some examples, votes for or against a question from other participants may increase or decrease the priority of the question.

Another mechanism that may affect a question or comment's priority may be a participant's "reputation." For example, a video conference provider may maintain a "reputation" score for each of its registered users based on meeting attendance, whether the registered user has ever been removed from a meeting by the meeting host, priority scores for other questions or comments posed by the registered user, etc. Over time, registered users of the video conference provider may attend webinars and attempt to interact with the presenter or host. Histories of questions asked by a registered user and the corresponding priorities may be stored by the video conference provider and associated with the respective user's account. In addition, whether the user was selected to interact for a particular question may be stored as well.

As the registered user accumulates questions and corresponding priorities, the video conference provider may update a user "reputation" score based on those priorities and other information. Questions that were assigned high priorities may increase the user's reputation score, while those with low priorities may reduce it. Alternatively, occasions when the user was selected to interact during a webinar may increase the user's reputation score. Further, a webinar host or presenter may provide feedback scores on questions posed during the webinar, which may indicate high or low quality questions or comments. In some examples, other participants in various webinars may also provide feedback on users, such as based on the questions asked, comments presented, etc. Such feedback may include up- or down-votes on posed questions, comments, etc., or a rating of the user, such as by providing a numeric score, a number of "stars," etc. Such feedback scores may be used to further adjust the user's reputation score. Thus, when reputation scores for one or more webinar participants are available, the priority analysis software component 730 may incorporate the reputation score for a particular participant when they pose a question or comment.

In some examples, the video conference provider may also obtain votes from other participants to questions posed by various participants. For example, if one or more questions or comments are assigned priority scores above a threshold, the questions may be presented to other participants in the webinar. The participants may then be provided with an option to vote (for or against) on one or more of the questions. The accumulated vote totals may then be provided to the priority analysis software component 730, which may further adjust the priority of the corresponding questions or comments.

To determine a priority in this example, the priority analysis software component 730 determines a default priority to be assigned as an initial priority score for each new question received from the semantic analysis software component 720. That initial priority score may then be increased or decreased based on the semantic information. As discussed above, a high grammatical score may increase the initial priority score, while a low grammatical score may decrease it. The amount the initial priority score is increased or decreased may be static for grammar scores above or below a threshold, or the grammatical score may be directly applied to the initial priority score. In some examples, the initial priority score may only be increased, but with low grammar scores (with respect to a threshold) resulting in little to no increase, while those with high grammar scores resulting in a more significant increase. Similarly, complexity of terminology used in the question or comment may also affect the initial priority score, whether by increasing or decreasing it.

After applying question-specific semantic information to the initial priority score, the priority analysis software component 730 may further adjust the priority score based on whether multiple participants are asking the same or similar questions (or posing the same or similar comments), or based on the participant's corresponding reputation score. Each of these factors may contribute to a priority score for a question or comment, which may then be output by the system 700.

The example system 700 shown in FIG. 7, and as discussed above, includes software components 710-730 that may be stored on and executed by any suitable computing system, such as at one or more servers operated by a video conference provider. Further, these software components 710-730 may be implemented on separate computing systems. For example, speech recognition 710 may be performed at one server, or at a participant client device, while semantic analysis 720 and priority analysis 730 may be performed by one or more servers operated by the video conference provider or other third party.

Figure 8:
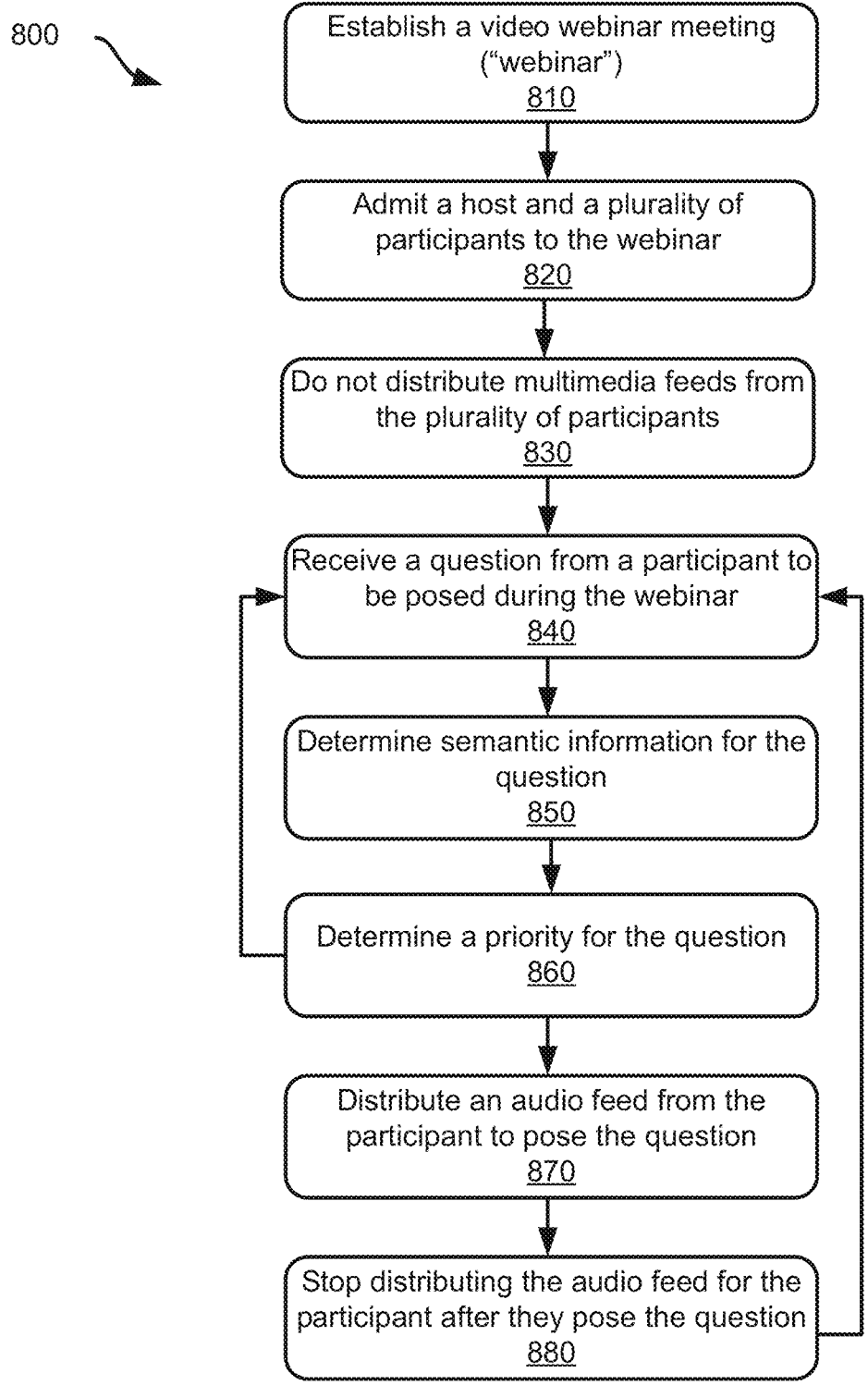
FIG. 8 shows an example method for mediating participant interactions during a video webinar meeting.

Referring now to FIG. 8, FIG. 8 shows an example method 800 for mediating participant interactions during a video webinar meeting. This example method 800 will be discussed with respect to the systems shown in FIGS. 3 and 7; however, any suitable systems according to this disclosure may be employed.

At block 810, the video conference provider 310 establishes a webinar, by creating a new meeting, generally as discussed above with respect to FIGS. 1-3, and configuring the meeting as a webinar. In this example, the host scheduled a meeting with the video conference provider 310 and configured it to be a webinar. When the host uses the webinar host client device 330 to access the meeting at the scheduled time, the video conference provider 310 may establish the webinar.

At block 820, the video conference provider 310 admits a webinar host and a plurality of participants to the webinar. As discussed above, the webinar host may use the host client device 330 to request access to the webinar. The video conference provider 310 can authenticate the host and admit them to the webinar, generally as discussed above with respect to FIGS. 1-2. In addition, upon determining that the host is a host of the webinar, the video conference provider 310 may provide access to various webinar controls to the host, such as to designate one or more participants as presenters, to distribute or stop distributing participants' multimedia streams to other participants in the webinar, to remove participants from the webinar, etc. In addition, the video conference provider 310 may begin receiving multimedia streams from the host client device 330 and provide them to any participant client devices that are connected to the webinar. Similarly, the video conference provider 310 may admit multiple participant client devices 340a-m to the webinar.

At block 830, the video conference provider 310 does not distribute multimedia streams from the plurality of participant client devices. For example, the video conference provider 310, upon determining that the participant client devices 340a-m are not host client devices, may disable multimedia streams from those client devices 340a-m, such as by sending indications to video conference software clients executed by the client devices 340a-m to disable audio and video streams. Alternatively, the video conference provider 310 may receive multimedia streams from the participant client devices 340*a-m*, but may not further distribute those streams to any other client devices connected to the webinar.

At block 840, the video conference provider 310 receives a question from a participant to be posed during the webinar, generally as discussed above with respect to FIGS. 5 and 7. For example, a participant may interact with a GUI 500 provided by a video conference software client and select a GUI element to type in a text question, e.g., text entry field 534, or to speak a question into a microphone, and select an "Ask Question" button 530 in the GUI. The video conference provider 310 may receive the text message or an audio stream from the participant client device 340*a-m*. Moreover, the video conference provider 310 may receive questions from multiple participant client devices at any given time. Such questions may be received substantially simultaneously or spread out over a period of time.

At block 850, the video conference provider 310 determines semantic information based on the question. For example, as discussed above with respect to FIG. 7, the video conference provider 310 may use a semantic analysis software component 720 to analyze a question and output semantic information based on the question.

At block 860, the video conference provider 310 determines a priority for the question based on one or more parameters generally as discussed above with respect to FIG. 7, such as based on a semantic information determined by semantic analysis of the question at block 850, whether similar questions were asked by other participants, times at which other similar questions were asked by other participants, a reputation score of the participant asking the question, etc. It should be appreciated that while this example method determines semantic information based on the question, such semantic information may not be used to determine a question's priority, in some examples. For example, a participant with a sufficiently high reputation score may be allowed to pose a question without semantic analysis being performed on the question. Further, some examples may employ voting from other participants rather than employing semantic analysis by the video conference provider 310. In some examples, a webinar host, panelist, or webinar manager may manually set or change a priority of a user's submission, e.g., a question or comment.

In some examples, the video conference provider 310 may also regulate the number of questions a particular participant may ask. For example, the video conference provider 310 establish a minimum time period between posing a question to the host or a presenter and submitting another question. Thus, the video conference provider 310 may determine an elapsed time between when a participant was selected to pose a question to the host or a presenter at block 870 and when a new question was received from the participant. If the participant attempts to ask an additional question within the threshold period of time from when they posed their last question, the video conference provider 310 may discard the question and provide a notification to the participant that they are in a "cool-down" period and must wait to submit further questions. In some examples, the video conference provider 310 may instead establish a maximum number of questions a participant may pose during the webinar and, if the participant attempts to pose questions after reaching the maximum, the video conference provider 310 may discard further questions or otherwise prevent the participant from asking further questions. It may also provide an indication to the participant that they have reached a question limit.

At block 870, the video conference provider 310 distributes an audio stream (or both an audio stream and a video stream) associated with the participant to the participants in the webinar, including the host(s) and presenter(s), based on the priority to enable the first participant to pose the first question. As discussed above with respect to FIG. 6, the host or a presenter in the webinar may receive questions from the video conference provider based on the priorities of those questions. The questions may be presented to the host or presenter within a GUI 600 provided by a video conference software client, and the host or presenter may select one to be posed. In response, the video conference provider 310 may receive an indication that identifies the question. The video conference provider 310 may then identify the participant corresponding to the selected question and provide a notification to the participant, via the GUI 500, that their question has been selected and they can interact with the webinar to ask it. In some examples, the video conference provider 310 may provide the question to the participant's client device, which may display it on the screen for the participant to read and ask. The video conference provider 310 may then distribute the participant's audio stream (and video stream in some examples) to allow the participant to pose the question.

In some examples, the video conference provider 310 may use the priority information to select a question to be presented and may notify the host or presenter that a participant has a question. The host or presenter may be provided with an option to allow the question to be asked, e.g., so they can pause their presentation and be ready for the question, and if the host or presenter agrees to allow the question, the video conference provider 310 can distribute the participant's audio (and video) stream to allow the participant to ask the question.

At block 880, after the participant has posed their question, the video conference provider 310 may then again stop distributing the participant's audio and video streams to both allow the host or presenter to answer the question and to prevent the participant from further interacting with the webinar. However, in some examples, the video conference provider 310 may provide an option to the host or presenter to allow them to continue to interact with the participant, e.g., to ask if the participant has a follow-up question or if the response answered the participant's question. The host or presenter may then select an option in the GUI 600 to indicate that the question has been answered. In response, the video conference provider 310 may then stop distributing the participant's video and audio streams and resume normal webinar functionality.

Once the video conference provider 310 has stopped distributing the participant's audio stream at block 880, the method may return to block 840 as further questions are received from participants. It should be appreciated that while the method illustrates a process for a single participant asking a question, many questions may be received, resulting in blocks 840-860 being performed multiple times. However, completing block 860 may not immediately result in the method 800 proceeding to block 870. Instead, the video conference system may accumulate questions and corresponding priorities over time while only permitting participants to pose questions occasionally during the webinar. This may help ensure that the webinar proceeds normally with only sporadic interruptions for questions. And while the blocks in this example method 800 are shown being performed in a particular order, they may be performed in any suitable order according to various examples.

Figure 9:
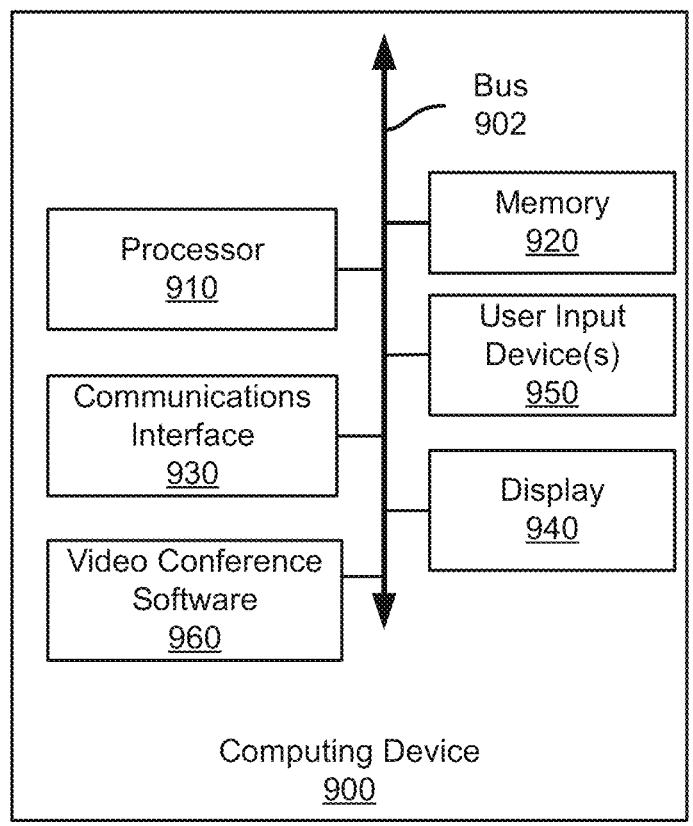
FIG. 9 shows an example computing device suitable for use with example systems and methods for mediating participant interactions during a video webinar meeting according to this disclosure.

Referring now to FIG. 9, FIG. 9 shows an example computing device 900 suitable for use in example systems or methods for mediating participant interactions during a video webinar meeting according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for mediating participant interactions during a video webinar meeting according to different examples, such as part or all of the example method described above with respect to FIG. 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes video conference software 960 to enable a user to join and participate in a video conference, such as a conventional meeting or webinar, by receiving multimedia streams from a video conference provider, sending multimedia streams to the video conference provider, joining and leaving webinars, such as described throughout this disclosure, etc.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    establishing a video webinar meeting;
    admitting a presenter and a plurality of participants to the video webinar meeting, the video webinar meeting configured to provide one-way communications from the presenter to the plurality of participants and to provide audio streams from the presenter to each participant of the plurality of participants and to prevent audio streams from each participant of the plurality of participants from being distributed to the presenter or to other participants of the plurality of participants;
    not distributing audio streams from the plurality of participants to other participants in the video webinar meeting;
    receiving, from a first participant, a first submission to be posed during the video webinar meeting;
    determining a priority for the first submission based on one or more parameters;
    responsive to selecting the first submission based on the priority:
        providing a notification to the presenter and to the first participant that the submission has been approved;
        distributing an audio stream associated with the first participant to the presenter and the remaining plurality of participants based on the priority to enable the first participant to pose the first submission; and responsive to an indication from the presenter that the first submission has been completed, not distributing audio streams from the first participant.

2. The method of claim 1, further comprising:
determining semantic information based on the first submission; and
wherein the one or more parameters include the semantic information.

3. The method of claim 1, further comprising:
receiving a plurality of submissions from a subset of the plurality of participants;
determining commonalities between the received plurality of submissions and the first submission; and
wherein the one or more parameters comprise the commonalities.

4. The method of claim 1, further comprising:
presenting the first submission to a subset of the plurality of participants;
receiving votes from the subset of the plurality of participants; and
wherein the one or more parameters comprise the votes.

5. The method of claim 1, wherein receiving the first submission comprises:
receiving audio signals from a microphone associated with the first participant, and
converting the audio signals to text; and
wherein determining the priority of the first submission is based on the text.

6. The method of claim 1, wherein the one or more parameters comprise a reputation score associated with the first participant.

7. The method of claim 1, further comprising:
receiving, from the first participant, a second submission to be posed during the video webinar meeting;
determining an elapsed time between the distributing the audio stream associated with the first participant to enable the first participant to pose the first submission and receiving the second submission; and
responsive to determining the elapsed time does not satisfy a time threshold, discarding the second submission.

8. The method of claim 7, further comprising providing a notification to the first participant indicating a cool-down period between submissions.

9. The method of claim 1, further comprising:
receiving one or more votes associated with the first submission; and
determining an updated priority for the first submission based on the one or more votes.

10. The method of claim 1, further comprising:
receiving a manual change to the priority for the first submission from a second participant of the plurality of participants, the second participant being the presenter, a panelist, or a webinar manager; and
updating the priority for the first submission based on the manual change.

11. The method of claim 1, further comprising distributing a video stream associated with the first participant to the presenter and the remaining plurality of participants based on the priority to enable the first participant to pose the first submission.

12. A system comprising:
a communications interface;
a non-transitory computer-readable medium; and
one or more processors in communication with the communications and non-transitory computer-readable medium, the one or more processors configured to execute processor-executable instructions stored in the non-transitory computer-readable medium to:
establish a video webinar meeting;
admit a presenter and a plurality of participants to the video webinar meeting, the video webinar meeting configured to provide one-way communications from the presenter to the plurality of participants and to provide audio streams from the presenter to each participant of the plurality of participants and to prevent audio streams from each participant of the plurality of participants from being distributed to the presenter or to other participants of the plurality of participants;
not distribute audio streams from the plurality of participants to other participants in the video webinar meeting;
receive, from a first participant, a first submission to be posed during the video webinar meeting;
determine a priority for the first submission based on one or more parameters;
responsive to selecting the first submission based on the priority:
provide a notification to the presenter and to the first participant that the submission has been approved;
distribute an audio stream associated with the first participant to the presenter and the remaining plurality of participants based on the priority to enable the first participant to pose the first submission; and
responsive to an indication from the presenter that the first submission has been completed, not distribute audio streams from the first participant.

13. The system of claim 12, wherein the one or more processors are configured to execute further processor-executable instructions stored in the non-transitory computer-readable medium to:
receive a plurality of submissions from a subset of the plurality of participants;
determine commonalities between the received plurality of submissions and the first submission; and
wherein the determination of the priority of the first submission is based on the commonalities.

14. The system of claim 12, wherein the one or more processors are configured to execute further processor-executable instructions stored in the non-transitory computer-readable medium to:
determine semantic information based on the first submission; and
wherein the one or more parameters include the semantic information.

15. The system of claim 12, wherein the one or more processors are configured to execute further processor-executable instructions stored in the non-transitory computer-readable medium to:
present the first submission to a subset of the plurality of participants;
receive votes from the subset of the plurality of participants; and
wherein the one or more parameters comprise the votes.

16. The system of claim 12, wherein the one or more processors are configured to execute further processor-executable instructions stored in the non-transitory computer-readable medium to:
receive audio signals from a microphone associated with the first participant, convert the audio signals to text; and
wherein determining the priority of the first submission is based on the text.

17. The system of claim 12, wherein the one or more parameters comprise a reputation score associated with the first participant.

18. The system of claim 12, wherein the one or more processors are configured to execute further processor-executable instructions stored in the non-transitory computer-readable medium to:
receive, from the first participant, a second submission to be posed during the video webinar meeting;
determine an elapsed time between the distributing the audio stream associated with the first participant to enable the first participant to pose the first submission and receiving the second submission; and
responsive to a determination that the elapsed time does not satisfy a time threshold, discard the second submission.

19. The system of claim 18, wherein the one or more processors are configured to execute further processor-executable instructions stored in the non-transitory computer-readable medium to provide a notification to the first participant indicating a cool-down period between submissions.

20. A non-transitory computer-readable medium comprising processor-executable instructions configured to cause one or more processors to:
establish a video webinar meeting;
admit a presenter and a plurality of participants to the video webinar meeting, the video webinar meeting configured to provide one-way communications from the presenter to the plurality of participants and to provide audio streams from the presenter to each participant of the plurality of participants and to prevent audio streams from each participant of the plurality of participants from being distributed to the presenter or to other participants of the plurality of participants;
disable audio streams from the plurality of participants;
receive, from a first participant, a first submission to be posed during the video webinar meeting;
determine a priority for the first submission based on one or more parameters;
responsive to selecting the first submission based on the priority:
provide a notification to the presenter and to the first participant that the submission has been approved;
distribute an audio stream associated with the first participant to the presenter and the remaining plurality of participants based on the priority to enable the first participant to pose the first submission; and
responsive to an indication from the presenter that the first submission has been completed, not distribute audio streams from the first participant.

21. The non-transitory computer-readable medium of claim 20, further comprising processor-executable instructions configured to cause one or more processors to:
determine semantic information based on the first submission; and
wherein the one or more parameters include the semantic information.

22. The non-transitory computer-readable medium of claim 20, further comprising processor-executable instructions configured to cause one or more processors to:
receive a plurality of submissions from a subset of the plurality of participants;
determine commonalities between the received plurality of submissions and the first submission; and
wherein the one or more parameters comprise the commonalities.

23. The non-transitory computer-readable medium of claim 20, further comprising processor-executable instructions configured to cause one or more processors to:
presenting the first submission to a subset of the plurality of participants;
receiving votes from the subset of the plurality of participants; and
wherein the one or more parameters comprise the votes.

24. The non-transitory computer-readable medium of claim 20, wherein receiving the first submission comprises:
receiving audio signals from a microphone associated with the first participant,
converting the audio signals to text; and
wherein determining the priority of the first submission is based on the text.

25. The non-transitory computer-readable medium of claim 20, wherein the one or more parameters comprise a reputation score associated with the first participant.

26. The non-transitory computer-readable medium of claim 20, further comprising processor-executable instructions configured to cause one or more processors to:
receive, from the first participant, a second submission to be posed during the video webinar meeting;
determine an elapsed time between the distributing the audio stream associated with the first participant to enable the first participant to pose the first submission and receiving the second submission; and
responsive to a determination that the elapsed time does not satisfy a time threshold, discard the second submission.

27. The non-transitory computer-readable medium of claim 26, further comprising processor-executable instructions configured to cause one or more processors to provide a notification to the first participant indicating a cool-down period between submissions.

* * * * *